UNITED STATES PATENT OFFICE.

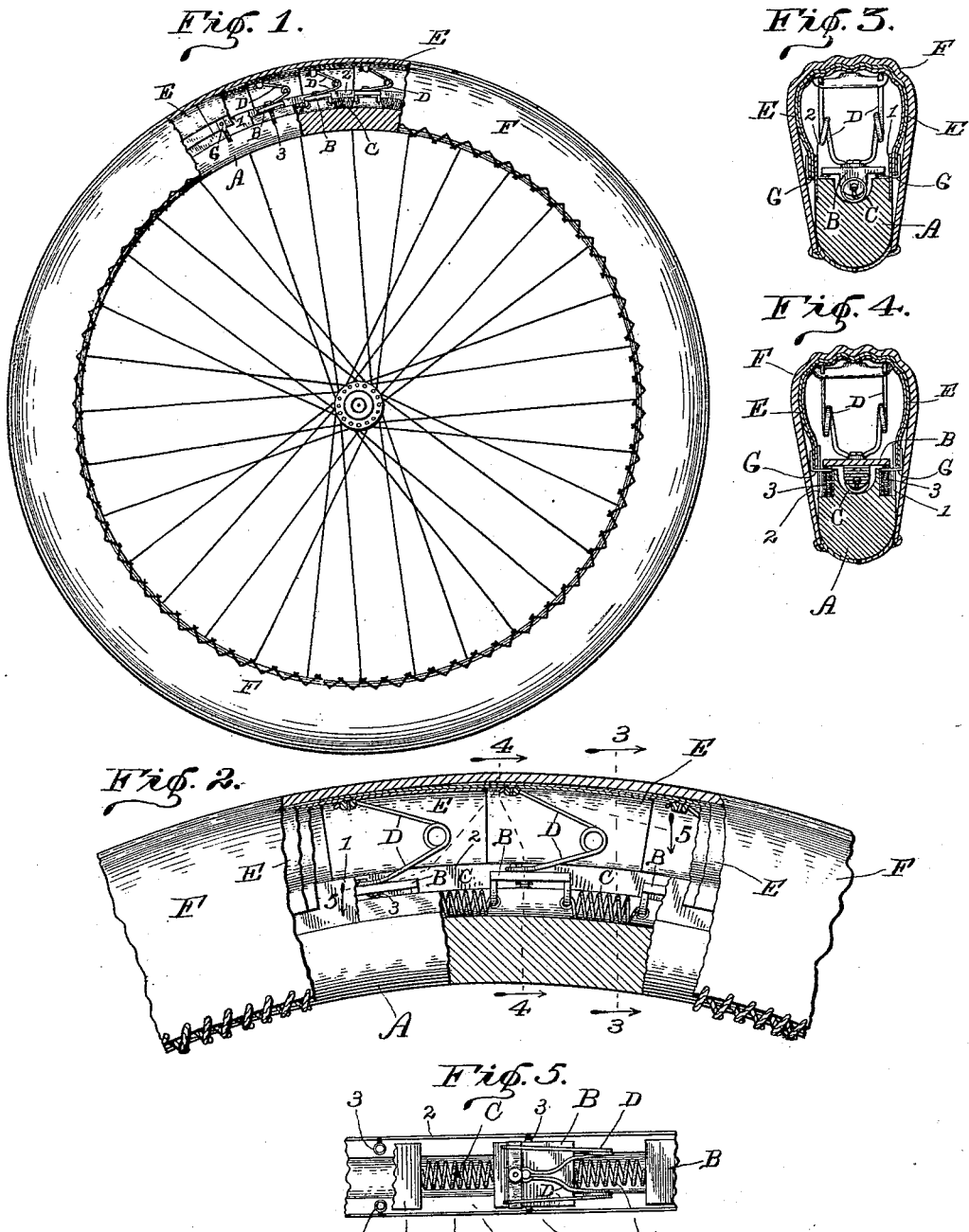

ISRAEL W. GREGG, OF ELWOOD, INDIANA, ASSIGNOR OF ONE-HALF TO JOHN F. RODIFER, OF SAME PLACE.

VEHICLE-WHEEL.

SPECIFICATION forming part of Letters Patent No. 640,652, dated January 2, 1900.

Application filed June 7, 1899. Serial No. 719,711. (No model.)

*To all whom it may concern:*

Be it known that I, ISRAEL W. GREGG, a citizen of the United States, residing at Elwood, in the county of Madison and State of Indiana, have invented certain new and useful Improvements in Vehicle-Wheels, of which the following is a specification.

This invention relates to that class of wheels in which an outer tread or sheath of some suitable fabric, such as rubber, is supported by inner metallic overlapping sections which in turn are supported by springs.

It consists in various details of construction and arrangements and combinations of parts, as will be hereinafter more particularly described and claimed.

Referring to the accompanying drawings, which are made a part hereof and on which similar reference characters indicate similar parts, Figure 1 is a side elevation of a wheel embodying my present invention, a portion being broken away to show the interior construction; Fig. 2, a side elevation of a fragment thereof on a considerably-enlarged scale, portions being broken away, as before; Fig. 3, a transverse sectional view on the dotted line 3 3 in Fig. 2; Fig. 4, a similar view on the dotted line 4 4 in Fig. 2, and Fig. 5 a plan view of so much of the interior construction as is seen from the dotted line 5 5 in Fig. 2.

The felly A is shown as made of wood. Circumferential grooves are cut along its outer edges, in which are seated the annular flange-rings 1 and 2. Near its edges are suitable pockets, within which are seated springs 3, and above these springs are saddles B. These saddles are arranged at suitable intervals around the periphery of the felly A, resting in a suitable groove therein, and are connected by springs C. Other springs D, preferably duplex in form, are united to the saddles B at one end, and the others extend up against and are attached to the under sides of the overlapping sections or plates E. These plates support the outer sheath or tread F of the wheel, and the exposed portions of them come in immediate contact with such sheath, other portions being covered by the overlapping adjacent portions of the like parts. Angle-plates G may be attached to the metal sections E and extend across beneath the saddles B and form the parts with which the springs 3 come in immediate contact, as shown in Fig. 4, the plates G being thus in part supported directly from the springs 3 instead of through the intermediary of the saddles B.

The sections E are preferably corrugated, as shown, and the outer sheath or tread F should be correspondingly corrugated or fitted to the corrugations.

Having thus fully described my said invention, what I claim as new, and desire to secure by Letters Patent, is—

1. The combination, in a wheel, of a felly having pockets therein, springs in said pockets, overlapping metal sections arranged outside of said fellies, angle-plates attached to said sections and extending in and resting upon said springs, saddles arranged at intervals around the felly, springs uniting the several saddles, and other springs carried by said saddles and supporting the overlapping metal sections.

2. The combination, in a wheel, of the felly, the sheath or tread, overlapping metal sections within said sheath or tread, saddles carried by the felly, springs uniting the several saddles, and other springs interposed between the saddles and the overlapping metal sections whereby the latter are supported from the former, substantially as shown and described.

3. The combination, in a vehicle-wheel, of the felly, the sheath or tread, saddles arranged at intervals around the felly, springs uniting the several saddles arranged in a groove in said felly, and springs supported by and extending from said saddles to said overlapping metal sections.

4. The combination, in a vehicle-wheel, of a felly having grooves around its peripheral edges, annular rings set in said grooves and extending up and forming bearing-surfaces for metal sections, said metal sections being constructed and arranged to overlap each other and substantially U-shaped in form with their edges resting against said rings, suitable springs carried from the felly and supporting said metal sections, and a suitable sheath or tread surrounding the whole, substantially as shown and described.

In witness whereof I have hereunto set my hand and seal, at Elwood, Indiana, this 31st day of May, A. D. 1899.

ISRAEL W. GREGG. [L. S.]

Witnesses:
 HERMAN F. WILKIE,
 DANIEL L. GREEN.